United States Patent [19]

Teti

[11] 4,249,854
[45] Feb. 10, 1981

[54] LOW PROFILE FORK LIFT FOR MINE VEHICLES

[75] Inventor: John J. Teti, Saltville, Va.

[73] Assignee: Pyott-Boone Machinery Corporation, Saltville, Va.

[21] Appl. No.: 1,152

[22] Filed: Jan. 5, 1979

[51] Int. Cl.$^3$ .............................................. B66F 9/00
[52] U.S. Cl. .................................. 414/685; 414/912; 414/917
[58] Field of Search .............. 414/607, 685, 686, 697, 414/700, 715, 723, 733, 724, 743, 912, 917

[56] References Cited

U.S. PATENT DOCUMENTS 3,349,933  10/1967  Simpson et al. ..................... 414/724

Primary Examiner—Robert G. Sheridan
Attorney, Agent, or Firm—Robert D. Yeager

[57] ABSTRACT

A rubber tired self powered mine vehicle utilizing a low profile fork lift assembly for handling palletized materials underground. The fork lift assembly consists of a fork lift plate and a parallel spaced apart base plate. The base plate is attached to the front of a mining vehicle by bucket mounting hole. The position of the base plate relative to the mine vehicle may be adjustable. The upper part of the fork lift plate is attached to the upper part of the base plate by set of horizontally spaced apart pivot links. The lower part of the fork lift plate is attached to the lower part of the base plate by a set of spaced apart pitmans. The long arm of each pitman extends between the base plate and the fork lift plate, while the short arm extends upward from the connection to the base plate. The short arm of the pitmans are engaged by hydraulic cylinders for raising and lowering forks which extend from the fork lift plate. The hydraulic operating cylinders are disposed behind the spaced plate and the operating rods extend through appropriate openings formed in the base plate. The body of the mine vehicle is suspended from its axles by hydraulic axle suspensions. By raising the front of the mine vehicle frame and lowering the rear or vice versa additional movement of the forks is possible. Mounted in the center end, between the base plate and the fork lift plate, are a pair of links having horizontally offset connection points to prevent side way movement of these plates.

15 Claims, 11 Drawing Figures

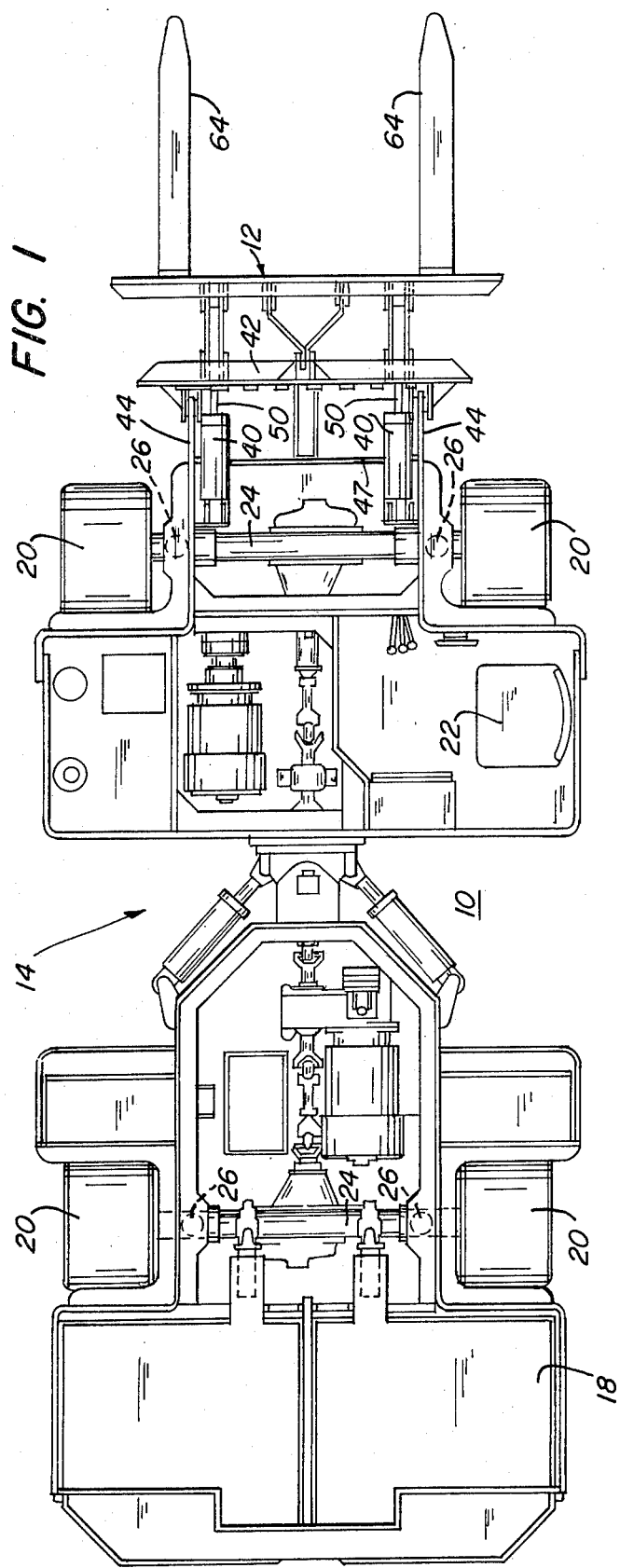
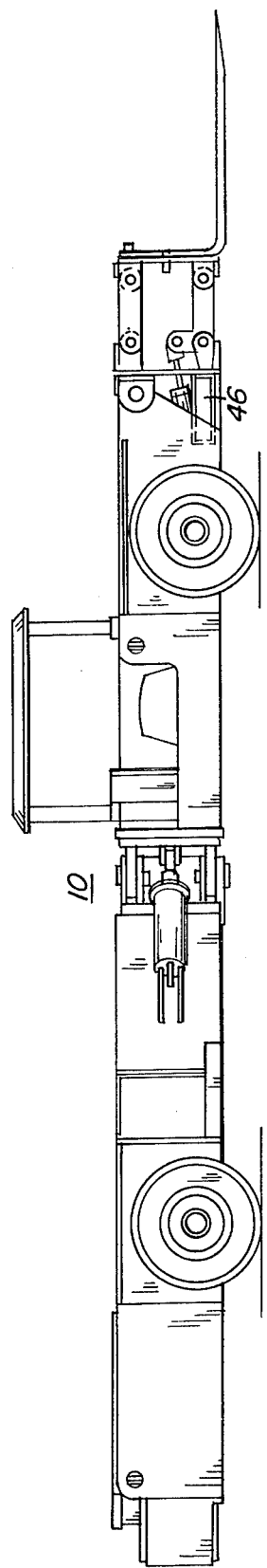
FIG. 1
FIG. 2

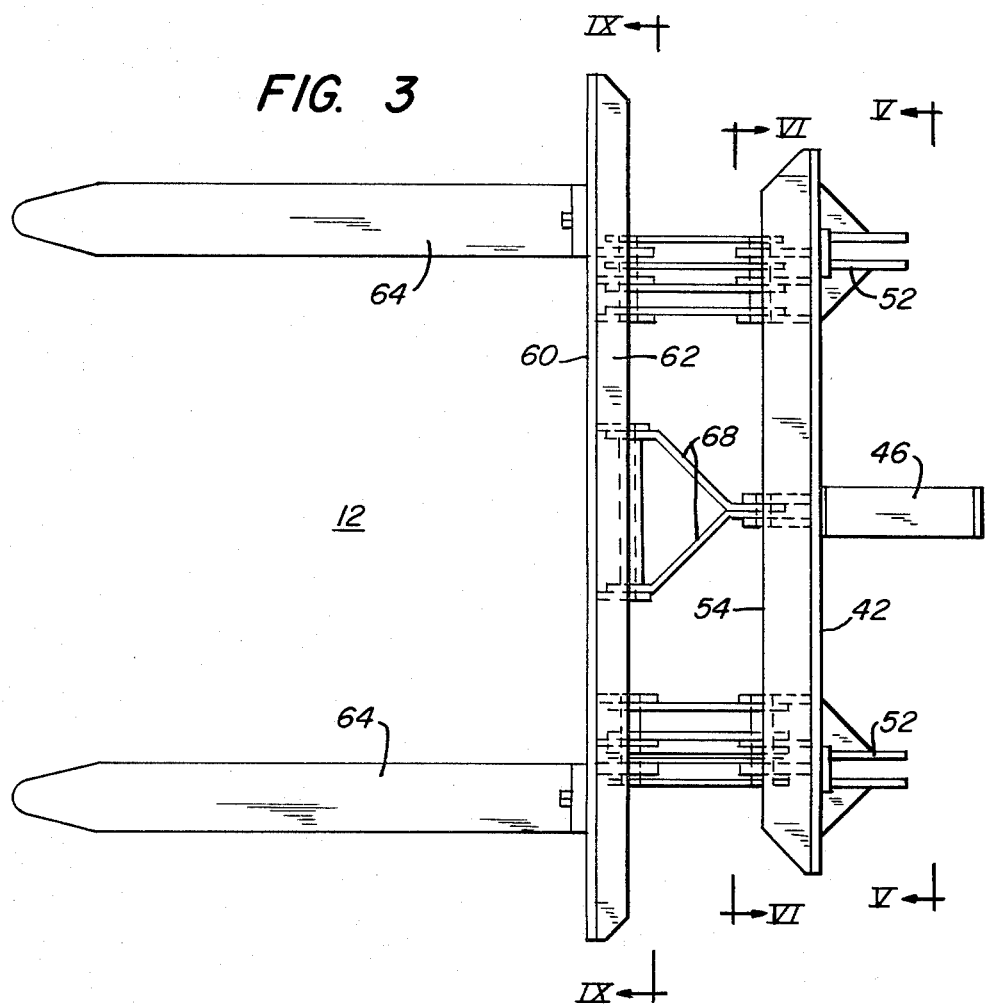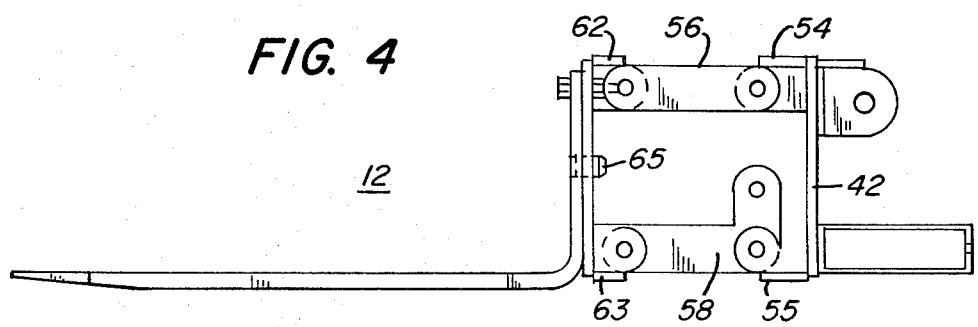

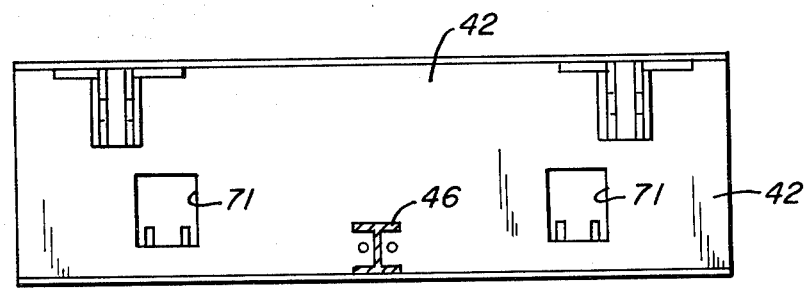
FIG. 5
FIG. 6
FIG. 7
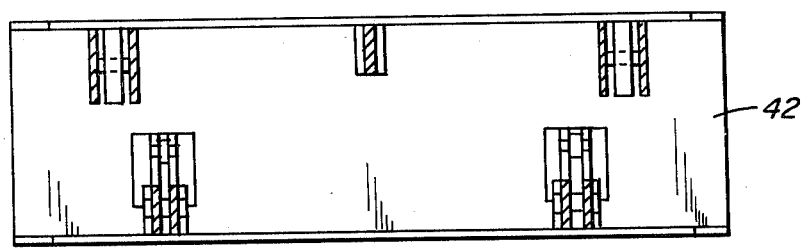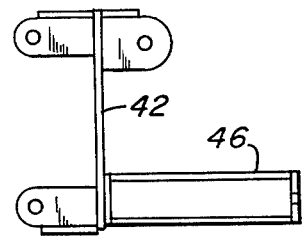
FIG. 8
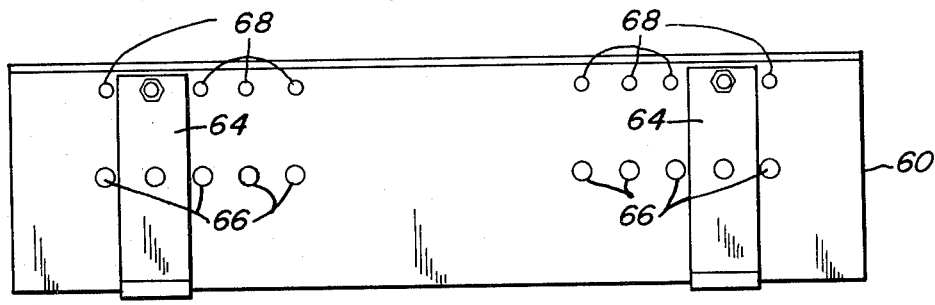
FIG. 9
FIG. 10
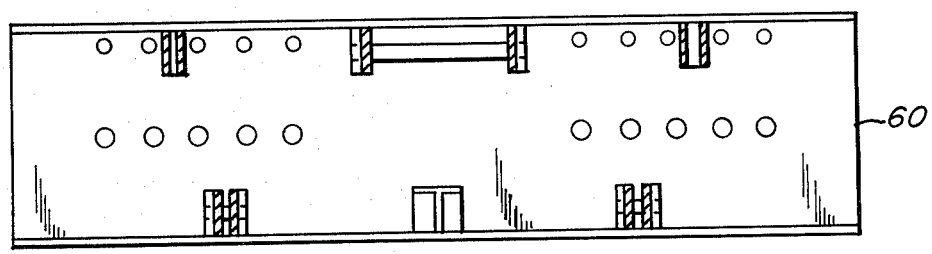

LOW PROFILE FORK LIFT FOR MINE VEHICLES

BACKGROUND OF THE INVENTION

1. Field of the Invention

This invention relates to mining vehicles and more particularly to rubber tired self propelled mining vehicle which utilizes a low profile fork lift assembly for handling palletized materials underground.

2. Description of the Prior Art

Rubber tired self-propelled mine vehicles are often used in mining for removing materials. These vehicles are characteristically constructed with a low profile to operate in the constraint of the mine shaft. Typically, mine vehicles which function to load, transport and remove mine materials are constructed as traction vehicles having a scoop supported at one end of the vehicle. The integral scoop is normally supported from the vehicle frame and is raised or lowered as required during operation by hydraulic cylinders. Scoops are often an inefficient way to handle supplies within a mine.

Presently many of the mine supplies arrive at the mine on pallets. These pallets must be broken up and the materials distributed inside the mine in a loose condition. This increases the handling expense. Presently it is a problem to handle palletized material underground. Height is at a premium and commercially available fork lift designs are not acceptable for underground use.

SUMMARY OF THE INVENTION

A self-powered mine vehicle utilizing a fork lift assembly for handling palletized materials underground is disclosed. The fork lift assembly replaces the scoop bucket on scoop vehicles when palletized mine material are to be moved. The disclosed rubber tired self-propelled mine vehicle, with the fork lift attachment, is rather versatile and can be maneuvered to deliver material pallets throughout the mine.

The disclosed fork lift assembly is mounted to the scoop bucket mounting holes after the scoop bucket is removed. The bucket operating hydraulic cylinders are utilized for operating the fork lift assembly.

The fork lift assembly consists of a rear base plate which attaches to the vehicle frame and a spaced apart parallel front fork lift plate. The base plate and the fork lift plate are connected by a plurality of spaced apart main links which maintain the plates parallel while permitting relative movement. A pair of forks which engage material pallet extend from the fork lift plate. A set of stabilizing links which extend transverse to the main links and plates are provided for preventing or eliminating relative sidway plate movement.

The upper part of the fork lift plate is connected to the upper part of the base plate by a set of double pivot links the same length. The long arm of each pitman has the same length as the links connecting the plates. In essence this results in a parallelogram which maintains the fork plate and the base plate parallel regardless of the height of the fork. The forks are thus maintained parallel to the ground. The disclosed construction provides satisfactory fork movement for a relatively small cylinder movement which is very desirable in a mine where space is at a premium.

The bottom of the fork lift plate is connected to the bottom of the base plate by a set of pitmans. The long arm of each pitman extends between the plates, while the short arm extends upward and forms an operating lever for the fork lift assembly.

A rearward extending stop is provided on the bottom of the base plate for limiting movement when the fork lift assembly is connected to the scoop bucket mounting holes. The disclosed fork lift construction is particularly suitable for use with mine vehicles wherein the frame can be positioned relative to the supporting axles. The preferred construction of mine vehicle utilizes adjustable hydraulic axle suspension. With this adjustable suspension the rear frame can be lowered and the front frame can be raised which results in a rotation giving an additional lift to the forks. Alternately, the front of the frame can be lowered and the rear of the frame can be raised resulting in an additional lowering of the forks.

The rearward extending stop may be made adjustable. If desired the fixed stop may be replaced with one or more hydraulic cylinders which can vary the angle of the base plate. By varying the angle of the base plate the forks can be tilted up or down as desired.

It is an object of this invention to teach a self powered rubber tired mine vehicle utilizing a fork lift assembly which is suitable for moving palletized material underground.

It is a further object of this invention to teach a fork lift assembly suitable for replacing a scoop bucket on a conventional rubber tired, self powered mine vehicle.

BRIEF DESCRIPTION OF THE DRAWINGS

For a better understanding of the invention, reference may be had to the preferred embodiments, exemplary of the invention shown in the accompanying drawings in which:

FIG. 1 is a top view of a self-propelled rubber tired underground mine vehicle having a fork lift assembly in accordance with the teaching of the present invention;

FIG. 2 is a side view of the mine vehicle shown in FIG. 1;

FIG. 3 is an enlarged view of a fork lift assembly constructed according to the teaching of the present invention;

FIG. 4 is a side view of the fork lift assembly shown in FIG. 3;

FIG. 5 is a rear view of the fork lift assembly of FIG. 3 along the line V—V;

FIG. 6 is a view of the fork lift assembly of FIG. 3 along the line VI—VI;

FIG. 7 is a side view of the base plate;

FIG. 8 is a front view of the fork lift assembly shown in FIG. 3;

FIG. 9 is a view of the fork lift assembly shown in FIG. 3 along the line IX—IX;

FIG. 10 is a side view of the front fork lift plate;

DESCRIPTION OF THE PREFERRED EMBODIMENTS

Figure 11:
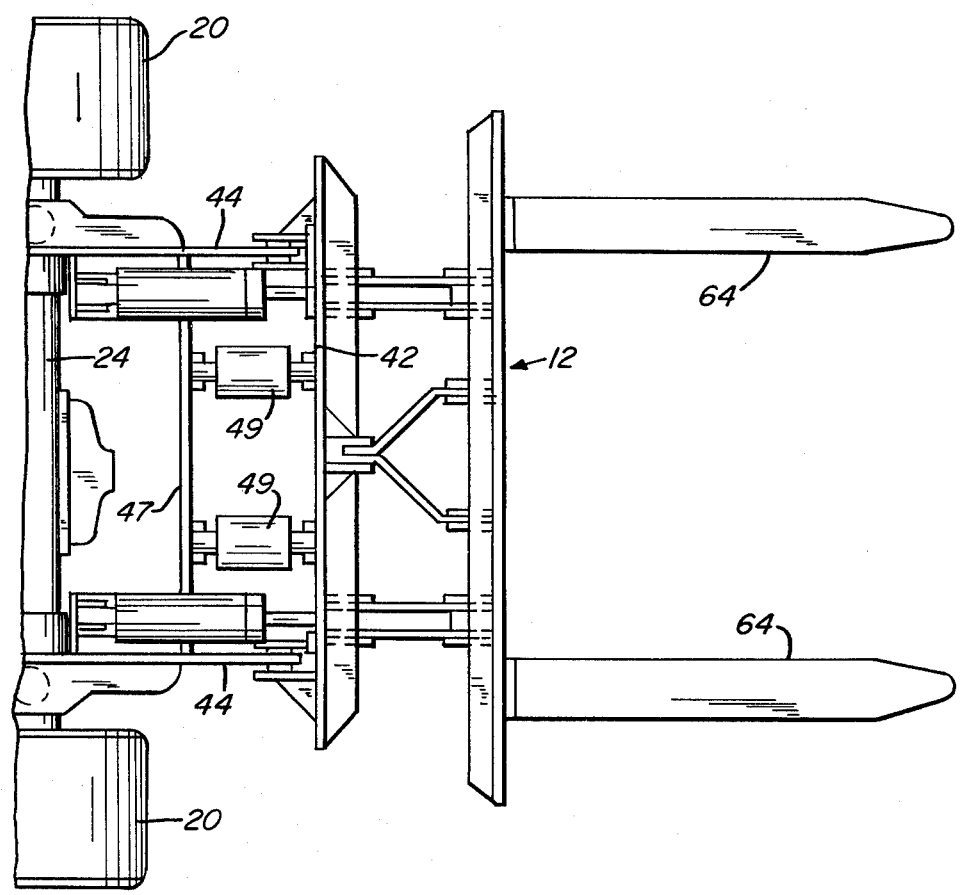
FIG. 11 is a top view of a fork lift assembly illustrating another embodiment of the invention wherein the horizontal orientation of the forks is adjustable.

Referring now to the drawings and FIGS. 1 and 2 in particular there is shown a self-propelled, rubber tired, mine vehicle 10 utilizing a fork lift assembly 12 in accordance with the teaching of the present invention. Vehicle 10 includes a traction unit 14 having fork lift assembly 12 supported from the front end thereof. Power unit 18 is provided at the rear end of the scoop vehicle 10. Power unit 18 supplies power to drive motor for driving wheels 20. Wheels 20, 21 are formed of rubber and permit vehicle 10 to be driven to various necessary locations in and out of the mine. Vehicle 10 is operated by an operator who sits in seat 22. A canopy 11, which is not shown in FIG. 1, is provided above seat 22 to provide protection. Canopy 11 is the highest item on vehicle 10 and its height limits the height of mine tunnel within which vehicle 10 can operate.

The operator drives the vehicle 10 as well as operates the fork lift assembly 12. Fork lift assembly 12 replaces a scoop bucket (not shown) which is normally used on mine vehicle 14 for transporting mined materials. Wheels 20, 21 support axles 24, 25 respectively. Vehicle 10 is supported by a hydraulic support 26 from axles 24, 25. The hydraulic supports 26 are operable between a raised and lowered position to change the height of mine vehicle 10. Hydraulic cylinders 40 which operate a scoop bucket when used, are connected to raise and lower the fork lift assembly 12.

Referring now to FIGS. 3 through 10 there is shown detailed drawings of the fork lift assembly 12 which is suitable for use with vehicle 10 to provide a low profile high capacity fork lift assembly suitable for use in underground mining operations. Fork lift assembly 12 includes a base plate 42 which is connected to vehicle 14. Extending side supports 44 are provided on vehicle 14 which are normally utilized for supporting a scoop bucket. When the fork lift assembly 12 is utilized rearward extending bifurcated mounts 52 are pinnned to side supports 44. A bottom stop 46 is provided on base plate 42. Bottom stop 46 engages a stop plate 47 on traction vehicle 14 when base plate 42 is connected to side supports 44. Stop plate 47 is connected to the frame of traction vehicle 14. Hydraulic cylinders 40 include operating rods 50 which are movable between an extended and a retracted position.

Spaced apart and parallel disposed with respect to the base plate 42 is a fork lift plate 60. A plurality of links 56 and 58 are connected between base plate 42 and fork lift plate 50, all having the same connected length, to maintain these plates parallel. Links 56 and 58 are pinned at their opposite ends to base plate 42 or fork lift plate 60. Each bottom link 58 is in the form of a pitman with the upward extending arm providing an operating lever which is engaged by operating rod 50 of hydraulic cylinder 40. The links 56 and 58 are pinned for pivotal movement to base plate 42 and fork lift plate 60. Reinforcing plates 54, 55, 62 and 63 are provided for strengthing the base plate 42 and fork lift plate 60 respectively at their point of connection to the links 56 or 58. By moving the upward extending portion of pitman 58 fork lift plate 60 is moved up or down with respect to base plate 42 while being retained in parallel relationship. A pair of links 68 which have a generally diagonal extending portion are connected between base plate 42 and fork lift plate 60 near the center thereof. These links 68 prevent any sideward shifting or movement of fork lift plate 60 relative to base plate 42.

Fork lift plate 60 has forks 64 connected to its front side. Forks 64 include a stud 65 which engages an opening 66 in fork lift plate 60. Openings 68 are provided above openings 66 for receiving a bolt to hold forks 64 securely to fork lift plate 60. The pattern of holes, 66 and 68 in fork lift plate 60 permit the separation and location of forks 64 to be varied as desired.

Stop 46 rather than being fixed may be adjustable to vary the slope of forks 64. Stop 46 may also be replaced with a hydraulic cylinder which can vary the angle of base plate 42 to assist in pick up of a load and in holding a load. Referring to FIG. 11 there is shown a portion of a mine vehicle 10 wherein stop 46 has been replaced by a pair of hydraulic cylinders 49. Hydraulic cylinders 49 are connected between stop plate 47 and base plate 42. Cylinders 49 can be retracted to point forks 64 down to assist in picking up a load. Alternately cylinders 49 can be extended to point forks 64 up to assist in holding a load and preventing it from slipping from forks 64. Hydraulic cylinders 49 connect to base plate 42 near its bottom.

Supplies often arrive at mines on pallets. Presently these pallets must be broken up and the materials distributed inside the mine in a loose condition adding an expense to handling. Height is at such a premium underground that normal fork lift trucks are not acceptable. With the disclosed vehicle 10 a fifteen inch vertical displacement of forks 64 of fork lift mechanism 12 is achieved. This 15 inch vertical displacement can be further increased by proper use of the hydraulic axle suspensions. With the hydraulic suspension the rear portion of the vehicle 12 frame can be lowered and the front portion raised which results in the rotation around the rear axle to give an additional $6\frac{1}{2}$ inch lift to the fork. By a reverse operation the front portion of the frame can be lowered and the rear raised resulting in depressing the forks $6\frac{1}{2}$ inches more. This provides for a total vertical displacement of 28 inches. This displacement is more than adequate to handle palletized supplies underground. Lift dimensions may of course be changed by increasing the length of the pitman 58 used on the fork lift assembly 12. The hydraulic cylinders which operate the fork lift assembly 12 are attached to the frame of the vehicle 14 and only the operating rod 50 extends within fork lift assembly 12. This permits for a lower profile fork lift assembly.

Operating rods 50 extend within opening 71 formed in the base plate 42 to engage the upward extending arms of the pitman 58. Upward extending arms of the pitman are at 90° to the arms linking the base plate 42 and the fork lift plate 60. This provides for a greater movement of forks 64 for a lesser cylinder stroke which is essential underground where space is at a premium. The low profile rubber tired self-propelled vehicle with the front and rear ends being raised and lowered to increase the range of operation of the forks is particularly advantageous for use in mines where head space is relatively limited.

What is claimed is:

1. A low profile self-propelled rubber tired mine vehicle comprising:
   a frame;
   a base plate supported from the end of said frame;
   a fork lift plate spaced apart from said base plate and disposed parallel thereto;
   a pair of forks extending from said fork lift plate;
   link means connecting said base plate and said fork lift plate for maintaining both plates parallel while permitting relative movement;
   operating lever means disposed between said base plate and said fork lift plate for moving said fork lift plate relative to said base plate;
   hydraulic cylinder actuating means connected to said frame and disposed behind said base plate having actuating rod means movable between an extended and a retracted position; and,
   connecting means for connecting the actuating rod which extends through an opening formed in the base plate to said operating lever means.

2. A low profile self-propelled rubber tired mine vehicle as claimed in claim 1 comprising:
hydraulic cylinder means connected between said frame and said base plate for adjusting their relative position.

3. A low profile self-propelled rubber tired mine vehicle as claimed in claim 1 wherein said base plate comprises:
a top connecting means for connecting the top of said base plate to the frame; and,
a bottom stop extending from the bottom of the base plate to engage the frame to limit relative movement of said base plate.

4. A low profile self-propelled rubber tired mine vehicle as claimed in claim 3 comprising:
axle means supported by the rubber tires; and,
hydraulic suspension for supporting said frame from said axle means; and,
said hydraulic suspension being adjustable to adjust the height of said frame relative to said axle means.

5. A low profile mine vehicle as claimed in claim 4 wherein:
said fork lift plate includes a plurality of adjustment openings for permitting adjusting the position of said pair of forks.

6. A mine vehicle comprising:
a frame;
a pair of axles;
wheels supporting said axles from the ground;
hydraulic suspension means supporting said frame from said pair of axles and being adjustable for said position of said frame relative to said pair of axles;
a pair of support plates extending from the frame of said mine vehicle;
a pair of hydraulic cylinders, having extending and non-extending ends, disposed between said pair of support plates and connected at their non-extending ends to said mine vehicle frame;
a base plate pinned in proximity to its top to said pair of supports and being positioned in front of said hydraulic cylinders;
a stop connected to the base plate beneath its connection to said pair of support plates to limit movement of said base plate;
a fork lift plate, spaced apart from said base plate;
a pair of forks extending from said fork lift plate;
link means connecting said base plate and said fork lift plate for maintaining said base plate and said fork lift plate parallel while permitting relative movement;
operating lever means, disposed between said base plate and said fork lift plate, for moving said fork lift plate relative to said base plate; and,
connecting means for connecting the extending end of said hydraulic cylinder to said operating lever means so that operation of said hydraulic cylinders moves said fork lift plate relative to said base plate.

7. A mine vehicle as claimed in claim 6 wherein: said stop is adjustable.

8. A mine vehicle as claimed in claim 6 wherein:
said stop comprises hydraulic cylinder means for varying the angle of said base plate.

9. A mine vehicle as claimed in claim 6 wherein:
a pitman connects said base plate and said fork lift plate and the shorter arm of said pitman extends upward and between said base plate and said fork lift plate and comprises the operating lever which provides for distance multiplication providing for greater movement of said fork lift plate for lesser movement of said hydraulic cylinders.

10. A mine vehicle as claimed in claim 6 comprising:
an operator seat supported from said frame;
a protective canopy extending over said operators seat; and,
said fork lift plate limited to movement so that when said fork lift plate is in its maximum raised position it is lower than the protective canopy for said operator.

11. A mine vehicle as claimed in claim 6 comprising:
adjusting means for adjusting the relative spacing of said pair of forks.

12. In a mine vehicle having a pair of operating hydraulic cylinders disposed at the front and thereof between a pair of bucket support gussets with a fork lift assembly disposed at the front end and supported by the gussets and operated by the movement of the operating rods of the hydraulic cylinders, said fork lift assemblies comprises:
a first plate connected to the support gussets having openings through which the operating rods of the hydraulic operating cylinders extend;
a second plate separated from said first plate;
a pair of forks extending from said second plate;
a plurality of equal length links connected between said first and second plate to maintain said first and second plate parallel while permitting relative movement;
operating arms extending from a pair of the plurality of links, between the first and second plates, for engaging the operating rods of said hydraulic cylinder, said operating arm being shorter than the length of the links.

13. A mine vehicle having a fork lift assembly as claimed in claim 12 comprising:
a pair of links extending at an angle to said plurality of links for providing side to side stability between said first plate and said second plate.

14. A fork lift assembly for a mine vehicle as claimed in claim 13 comprising:
a series of adjustment openings formed in said second plate for permitting adjustment of the position of said forks.

15. A fork lift assembly for a mine vehicle as claimed in claim 12 comprising:
hydraulic cylinder means connecting said first plate to the mine vehicle for varying the vertical orientation of said first plate.

* * * * *